3,245,811
VESSEL LININGS

Peter H. Havranek and Ben Davies, Pittsburgh, Pa., assignors to Harbison-Walker Refractories Company, Pittsburgh, Pa., a corporation of Pennsylvania
No Drawing. Filed Mar. 5, 1964, Ser. No. 349,729
6 Claims. (Cl. 106—59)

This invention relates to fabrication of refractory linings for such as copper converters and other metallurgical vessels in which highly siliceous slags are present.

The earliest copper converters, of which we are aware, generally consisted of a steel vessel lined with a siliceous or silica refractory. These acid linings both protected the steel shell from overheating, as refractories conventionally do; and, additionally, provided some of the necessary siliceous flux for reaction with the FeO of the slag during the refining operation. These vessels, with a consumable type of siliceous acid lining, were replaced in about 1905 by the Pierce-Smith converter which employed a basic refractory lining. This type of vessel and lining became rather commonplace by the year 1909. These vessels, in modern practice, are lined with magnesia or magnesite brick (we use the terms magnesia or magnesite interchangeably, but intend to describe hard fired or dead burned MgO material). Some use has been suggested of unburned magnesia-chrome ore refractories; but the severity of modern operating techniques appears to be leading towards use of burned brick, exclusively, with chrome ore-magnesia ones being preferred.

In the operation of a Pierce-Smith-type converter, in which molten "matte" from a reverberatory furnace is charged to the converter wherein it is subjected to blasts of air, there are violent exothermic reactions induced due to oxidation of sulfates, chemical reaction between iron and sulfur, evolution of sulfur trioxide and the formation of intermediate reaction products such as iron sulfite, cuprous oxide and copper sulfide, and various other oxides.

Various of the oxides produced in the foregoing manner are understood to then react with the silica of the flux addition to form the ferrous silicate fayalite. Strong oxidizing conditions can cause oxidation of the ferrous oxide to magnetite. This latter reaction is particularly undesirable, because of magnetite buildup when the matte is returned to the reverberatory.

The mechanism of chemical attack upon basic refractory brick in a copper converter is fairly well known. In general, it is known that the high silica content of the slag causes a trend towards solubility of refractory magnesia within liquid ferrous silicates during converter operation. Of course, refractory destruction also occurs, due to physical contact with cold ingots and scrap which are charged during converter operation, as well as physical erosion and washing away of refractory material because of the turbulence of the converter reaction materials.

There is deep penetration by the slag and molten copper into magnesia-containing brick. Fayalite is one of the materials which appears to penetrate most deeply. In the absence of oxygen, the fayalite reacts with magnesia of the refractory, tending to open up the brick structure allowing still further penetration.

It is a primary object of this invention to provide an improved refractory suitable for lining copper converters especially of the Pierce-Smith type. It is another object of the invention to provide improved refractory for use in lining copper converters, which refractory is better able to resist penetration by slag and copper metal as well as exhibiting increased resistance to reaction with these materials.

In brief, this invention is, in large part, based upon our discovery that the magnesia content of chrome ore-magnesia and some magnesia-chrome ore brick can and should be rendered substantially chemically inert to attack by copper metal and copper converter slag. In a preferred embodiment, the invention consists of chrome ore-magnesia refractories intended for use in such as glass tanks and copper converters which have improved resistance to attack by highly siliceous slags, to thereby provide longer lining life. The refractories consist of a mixture of coarse chrome ore and finely divided fused magnesia-chrome ore refractory of special mineralogy. The fused magnesia-chrome ore refractory consists of about 60% magnesia, which magnesia contains at least about 96% MgO, and about 40% chrome ore, preferably Transvaal chrome ore. The fused grain is added as ball mill fines (substantially all —65 mesh—40 to 60% held on a 325 mesh screen), and, preferably, constitutes the major portion (at least about 50%) of the —65 mesh fraction of the batch used to make the brick. Optimum results are obtained when at least about 90%, by weight, of the —65 mesh fraction is the fused grain.

In a broad aspect, the invention is directed to refractory brick containing 15 to 55%, by weight, of the fused grain, the remainder being Philippine chrome ore. Again, the fused grain is substantially all ball mill fines. The preferred brick include on the order of about 25 to 45% of the fused grain. The brick are formed by conventional forming techniques, and fired to a temperature sufficient to obtain a ceramic bond.

The following examples are set forth as indicative of practice of the invention, in detail sufficient to allow those skilled in the art to practice it. The following is, thus, not intended as limiting on the true spirit and scope of the invention, which is as defined in the hereafter appended claims.

A series of mixes was prepared having an overall screen analysis as set forth in Table I.

TABLE I

| Screen analysis:* | Percent |
|---|---|
| —3 on 10 mesh | 14 |
| —10 on 28 mesh | 32 |
| —28 on 65 mesh | 11 |
| —65 mesh | 43 |

* Variation between this sizing and that of Table II is due to breakage in handling, etc.

In general, the batch has a —4+65 mesh coarser fraction and a —65 mesh fraction. The —65 mesh fraction can constitute 40 to 60% of the total batch, and 40 to 60% thereof is +325 mesh.

The batches were tempered with about 4%, by weight, of a 50–50 lignin liquid-water mixture, and pressed on a mechanical brick press at about 8000 p.s.i. The brick were burned at 2620 to 2900° F. Table II graphically presents a summary of this test work.

TABLE II

| Mix No. | A | B | C | D | E | F |
|---|---|---|---|---|---|---|
| Mix: | | | | | | |
| Philippine Chrome Ore/fused refractory grain ratio (by weight) | 85/15 | 75/25 | 65/35 | 55/45 | 45/55 | 65/35 |
| Philippine Chrome Ore, Percent: | | | | | | |
| −3½ +6 mesh | 15 | 15 | 15 | 15 | 15 | 15 |
| −6 +28 mesh | 50 | 50 | 50 | 40 | 30 | 50 |
| Ball Mill Fines (50–60% −325 mesh) | 20 | 10 | | | | |
| Fused Refractory Grain Ball Mill Fines (50–60% −325 mesh) | 15 | 25 | 35 | 35 | 35 | 35 |
| Linear Change in Burning, Percent | +0.9 | +0.6 | +0.3 | +0.6 | +0.3 | +0.3 |
| Bulk Density, p.c.f. (Av. 10) | 202 | 203 | 203 | 199 | 200 | 201 |
| Modulus of Rupture, p.s.i.: | | | | | | |
| At Room Temperature, (Av. 3) | 1,580 | 1,720 | 1,430 | 1,320 | 1,140 | 1,430 |
| At 2,300° F. (Hold Time 5 hours) (Av. 3) | 670 | 1,510 | 1,450 | 1,390 | 1,400 | 1,730 |
| Apparent Porosity (Av. 3), Percent | 20.9 | 18.4 | 18.4 | 21.3 | 20.8 | 19.1 |
| Drip Slag Test at 2,500° F. Using 1,600 gm. Copper Converter Slag: | | | | | | |
| Depth of eroded cavity, in | 0.3 | 0.2 | 0.15 | 0.15 | 0.15 | 0.2 |
| Width of eroded cavity, in | 1.2 | 1.0 | 0.8 | 0.8 | 0.9 | 0.7 |
| Volume eroded, cubic in | 0.5 | 0.4 | 0.4 | 0.3 | 0.4 | 0.3 |

The tests reported in Table II show exceptional density, i.e., over about 200 p.c.f., for brick according to the invention, excellent strength at room temperature and very satisfactory strength at temperatures of 2300° F. Mix A, which includes but 15% of the fused grain, while providing adequate strength, is not as satisfactory as our preferred 25 to 45% fused grain content, but still provides a distinct improvement over conventional chrome-magnesite brick. When less than 15% of the fused grain is used, hot strength drops off precipitously. In order to maintain good refractoriness and hot strength, all the sesquioxides and silica in the chrome ore must be combined with magnesia in the burned brick to form spinels ($MgO \cdot R_2O_3$) and forsterite ($2MgO \cdot SiO_2$), respectively. In commercial practice, the amount of magnesia added is usually 50% greater than theoretical to insure completion of these reactions during burning. In the present invention, this magnesia is added in the form of fused grain. A slight excess of free magnesia is not harmful, but substantially larger amounts would tend to reduce resistance to copper converter slag.

Table III sets forth the oxide analysis of the slag used in the test reported in Table II.

TABLE III

| | Percent |
|---|---|
| Silica ($SiO_2$) | 27.9 |
| Alumina ($Al_2O_3$) | 5.0 |
| Iron oxide ($Fe_2O_3$) | 61.0 |
| Chromic oxide ($Cr_2O_3$) | |
| Lime (CaO) | 1.5 |
| Magnesia (MgO) | 1.0 |
| Copper oxide (CuO) | 1.5 |
| Sulfur (S) | 0.5 |
| Soda ($Na_2O$) | 1.0 |
| Potash ($K_2O$) | 1.0 |
| Lithia ($Li_2O$) | 0.5 |
| | 100.0 |

Typical analysis of the Philippine chrome ore is as follows:

TABLE IV

| | Percent |
|---|---|
| Silica ($SiO_2$) | 5.5 |
| Alumina ($Al_2O_3$) | 29.2 |
| Chromic oxide ($Cr_2O_3$) | 32.1 |
| Iron oxide (FeO) | 12.6 |
| Lime (CaO) | 0.6 |
| Magnesia (MgO) | 18.8 |
| Ignition loss | 1.0 |

The fused grain is basic. It is a grain which, preferably, is made of Transvaal chrome ore and dead burned magnesia. The magnesia analysis is at least about 96% MgO, preferably 98% MgO, and made according to the process of United States Patent No. 3,060,000. Transvaal chrome ore has approximately the following chemical analysis: $SiO_2$ about 3%, $Al_2O_3$ about 15.7%, FeO about 24.1%, $Cr_2O_3$ about 43.9%, CaO about 0.3%, MgO about 11.0%, the remainder loss on ignition. The grain analysis, when made from a mixture of the Transvaal chrome ore and high purity magnesite, is approximately as follows: MgO about 63%, $Cr_2O_3$ about 20%, $Fe_2O_3$ about 12%, $SiO_2$ about 1%, the remainder being mostly the sesquioxides $Al_2O_3$ and CaO, predominantly $Al_2O_3$. Our preferred range of specifications for this fused grain is approximately as follows:

TABLE V

| | Percent |
|---|---|
| MgO | 60 to 65 |
| $R_2O_3$ ($Cr_2O_3$, $Al_2O_3$, $Fe_2O_3$) | 32 to 38 |
| Of the accessory oxides | 1 to 3 |
| $Fe_2O_3$, less than | 12 |
| $SiO_2$, less than | 2 |
| CaO, less than | 1 |
| BSG, greater than | 3.50 |
| Porosity, less than | 10 |

The above describes our preferred grain; but, any fused grain, which is mineralogically characterized by substantial homogeneity and has a highly crystalline matrix having spaced deposits of exsolved chrome spinel, can be used. The MgO content of the grain can vary between 40 and 80%.

As noted above, the second ingredient used to make our refractory is Philippine chrome ore. Other refractory grade chrome ores can be used, instead.

It can be seen from the foregoing that we are able to incorporate a relatively high MgO content in the resulting brick by use of the fused grain; but this MgO content is not readily available, nor in a pure or free state. The extensive exsolution of chrome spinel appears to, in fact, protect the MgO content, in some manner not completely understood, from attack by copper converter slag.

As noted above, the operable range of fused grain content is from about 15 to about 55%. The lower limit of 15% is considered critical. The upper limit is more flexible. In the broadest aspect of the invention, a brick is made from a batch mixture consisting essentially of chrome ore, preferably low silica, and fused grain. The batch can be considered to have two fractions; namely, a −4+65 mesh fraction and a −65 mesh fraction which should be the fused grain.

Having thus described the invention in detail and with sufficient particularity as to enable those skilled in the art to practice it, what is desired to have protected by letters patent is set forth in the following claims.

We claim:

1. A burned refractory brick for use in contact with siliceous slags and made from a batch consisting essentially of chrome ore and between 15 and 55%, by weight, −65 mesh chemically basic fused grain, said fused grain analyzing, on an oxide basis, about 60 to 65% of MgO, about 32 to 38% of the $R_2O_3$ oxides $Cr_2O_3$, $Al_2O_3$ and $Fe_2O_3$, with the $Fe_2O_3$ amounting to no more than about 12%, said fused grain mineralogically characterized by a substantially homogeneous and highly crystalline matrix having spaced deposits of chrome spinel, any silicates appearing as spaced substantially disconnected pockets through the grain, said batch having a −4+65 mesh fraction and a −65 mesh fraction, said −65 mesh fraction constituting from about 40 to about 60%, by weight, of the batch, and from 40 to 60% by weight, of said −65 mesh fraction being held on a 325 mesh screen.

2. A burned refractory brick for use in contact with siliceous slags and made from a batch consisting essentially of chrome ore and between 15 and 55%, by weight, −65 mesh chemically basic fused grain, said fused grain mineralogically characterized by substatnial homogeneity and a highly crystalline matrix having spaced deposits of exsolved chrome spinel, the MgO content of the grain ranging from about 40 to 80%, by weight, the remainder being chrome ore spinels, and silicates, said batch having a −4+65 mesh fraction and −65 mesh fraction, said −65 mesh fraction constituting from about 40 to about 60%, by weight, of the total weight of the batch, and from 40 to 60%, by weight, of said −65 mesh fraction being held on a 325 mesh screen.

3. The burned refractory brick of claim 2 made from a batch in which the fused grain constitutes from 25 to 45% of the total weight of the batch.

4. The burned refractory brick of claim 2 made from a batch in which the chrome ore is Philippine chrome ore.

5. A batch for use in making burned refractory brick and consisting essentially of chrome ore and between 15 and 55% −65 mesh chemically basic fused grain, said fused grain mineralogically characterized by substantial homogeneity and a highly crystalline matrix having spaced deposits of exsolved chrome spinel, the MgO content of the grain ranging from about 40 to 80%, by weight, the remainder being chrome spinels and silicates, said batch having a −4+65 mesh fraction and a −65 mesh fraction, said −65 mesh fraction constituting from about 40 to about 60%, by weight, of the total weight of the batch, and from 40 to 60%, by weight, of said −65 mesh fraction being held on a 325 mesh screen.

6. A composition of claim 1 wherein the major portion of said −65 mesh fraction is composed of said fused grain.

References Cited by the Examiner
UNITED STATES PATENTS

| | | | |
|---|---|---|---|
| 2,087,107 | 6/1937 | Heuer | 106—59 |
| 2,636,827 | 4/1953 | Lanser et al. | 106—59 |

TOBIAS E. LEVOW, *Primary Examiner.*

J. E. POER, *Assistant Examiner.*